Figure 1:
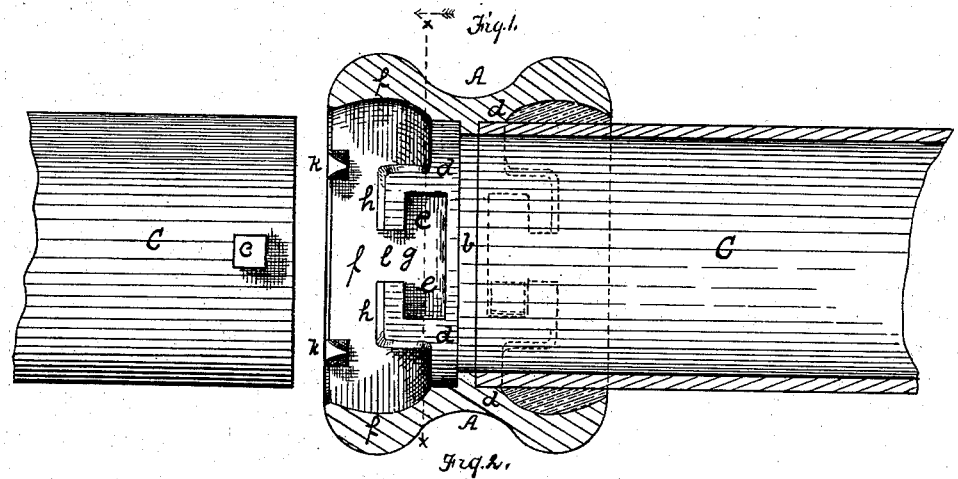

(No Model.)

E. C. CONVERSE.
COUPLING FOR TUBING.

No. 263,863. Patented Sept. 5, 1882.

Witnesses.
F. G. Kay
Jas. T. Young

Inventor.
Edmund C. Converse
by James T. Kay
Attorney.

UNITED STATES PATENT OFFICE.

EDMUND C. CONVERSE, OF PITTSBURG, PENNSYLVANIA.

COUPLING FOR TUBING.

SPECIFICATION forming part of Letters Patent No. 263,863, dated September 5, 1882.

Application filed June 12, 1882. (No model.)

*To all whom it may concern:*

Be it known that I, EDMUND C. CONVERSE, of Pittsburg, in the county of Allegheny and State of Pennsylvania, have invented a new and useful Improvement in Couplings for Tubing; and I do hereby declare the following to be a full, clear, and exact description thereof.

My invention relates to couplings for metal tubing, its object being to form a coupling whereby the several lengths of tubing can be connected without so weakening the tubing as where a screw-thread is cut into it to form connection by means of a screw-threaded socket. Where such a thread is cut into the tubing it is so weakened at the point threaded that to enable it to withstand the necessary internal pressure or any longitudinal strain or lateral bending strain the tubing is formed much thicker than necessary for the unthreaded portion of the tubing. It is evident that this increased thickness of the tubing necessarily increases not only its cost, but, on account of its increased weight, also adds much to the expense of transportation. For this reason a coupling by which the lighter metal tubing can be securely connected, so as to withstand not only the internal pressure of the water or other liquid, compressed air, or gas confined in or passing through it, but also any longitudinal strain consequent to the expansion and contraction of the tubing or lateral bending strain, is much sought after.

In Letters Patent granted to me January 10, 1882, is shown and described a coupling collar or sleeve for use with this light metal tubing, which has been found efficient under ordinary pressures; but the object of the present invention is to form a coupling which will form a secure and efficient connection for such tubing when subjected to any pressure or strain which the tubing is adapted to withstand, thus providing a coupling specially adapted to high pressures.

My invention consists essentially in combining with the tubing having one or more lugs or similar connecting devices a coupling collar or sleeve provided on the interior with a central ring against which the ends of the tubing butt or bear, proper seats or recesses on either side of said ring within which the lugs on the tubing engage, and annular calking recesses at each end beyond such seats or recesses, whereby after the connection between the tubing and collar has been effected the annular recesses may be filled and calked, and the calking material will lock the lugs in their seats and surround the tubing above the locking devices.

To enable others skilled in the art to make and use my invention, I will describe its construction and manner of use, referring for that purpose to the accompanying drawings, in which—

Figure 2:
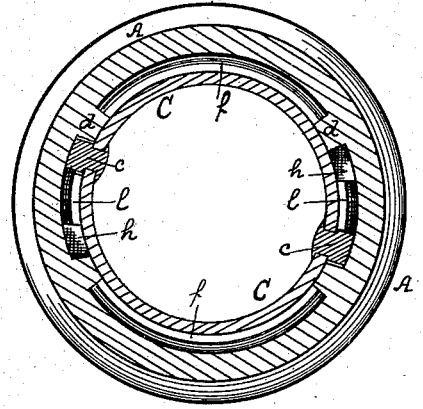
Figure 3:
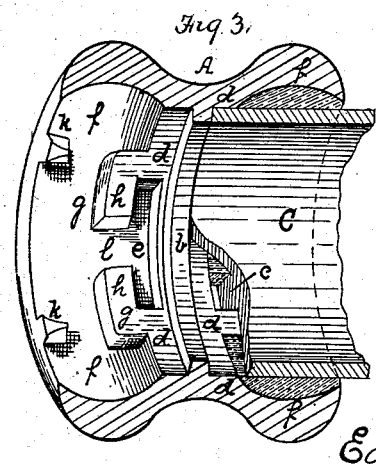

Figure 1 is a sectional view of the coupling-collar, showing one tube connected therein and the other tube in full lines ready to enter the collar. Fig. 2 is a cross-section on the line $x$ $x$, Fig. 1; and Fig. 3 is a perspective view, partly broken away, of the coupling collar.

Like letters of reference indicate like parts.

The coupling collar or sleeve A is preferably cast to shape, though it may be rolled or forged and turned, if desired. It is provided with the annular ring or projection $b$ midway between the ends, so as to form on either side of it an annular shoulder, against which the ends of the tube-sections C C butt or bear. The ring is made the same height as the thickness of the metal in the tubing, so that a smooth interior is obtained for the passage of the fluid to be connected, and no opportunity is afforded for the pressure of the fluid directly against the ends of the tubing. The inner faces, $d$, of the collar extend out a sufficient distance on either side of the central ring, $b$, to give a strong brace to the ends of the tubing, around which they fit neatly, being formed slightly tapering, if desired, so as to compress or bind the ends of the tubing around their entire circumference, thus rounding up the tubing, if bent out of shape, and enabling the body of the collar to support it against internal pressure-strain. Between these inner faces, $b$, and the ends of the collar are the annular calking-recesses $f$, for the reception of the lead or other calking material, these calking recesses being preferably formed inwardly flaring, being of larger diameter at the base or between the base and the mouth than at the mouth, and therefore holding the calking material more securely in place and preventing its displacement from any internal pressure-strain. Within the coupling-collar are the locking-seats $g$, which are shown formed between the inner face, $d$, and the calking-recess on each side of the central ring, $b$. The seat is formed of a rib, $h$, extending along the calking-recess, back of which the body of the collar is hollowed out or depressed, as at $e$, for the reception of the lug $c$ on the tubing, the lug catching behind this rib, and thus securely locking the tubing within the collar against longitudinal or drawing strain. The seat is preferably formed with a space, $l$, through which the lug in the tubing passes, and a rib, $h$, on either side of this space, so that the tubing can be turned in either direction to lock it within the collar. The number of locking lugs and seats formed on each end of the tubing and in the collar will depend on the diameter of the tubing to be connected, two such locking devices at each end being generally sufficient, except in connecting large tubing, when three or more may be employed. If desired, a series of three or more projections or wings, $k$, may be formed at the mouth of each calking recess, as shown in said Letters Patent granted to me January 10, 1882, the wings serving to center the tubing when introduced into the collar and during calking, as well as to support the tubing against and relieve the calking material from lateral or side strain during subsequent use. The faces of these wings or projections are shown substantially triangular in shape, the sides being cut away. This shape is adopted because it gives a broad bearing of the wings on the tubing at the mouth of the collar and yet permits the calking-tool to enter the part cut away and so calk or solidify the calking material under the lugs. The collar may, however, be used without these projecting wings, and will be sufficiently centered and supported by the inner faces, $d$, of the collar, and in that case the calking material can also be calked entirely around the tubing.

The lugs $c$ are preferably riveted on the tubing, as this does not require its reheating, though they may be welded thereto or expanded therefrom, neither method injuriously affecting the tubing, as the lugs are supported within their seats and the calking material enters within the seats back of the lugs and entirely fills the calking recess above the locking-connection, so that it prevents any leakage, even where there is an imperfection at the lugs.

In connecting tubing by my improved coupling collar or sleeve the ends of the tube-sections are inserted into the collar, the lugs $c$ passing through the spaces $l$ and the ends bearing against the central ring, $b$, and the tubing is then turned within the collar either to the right or left, so as to lock the lugs behind the ribs $h$, the tubing and collar being held by this connection against longitudinal or drawing strain. Where the tubing cannot be turned for any reason the collar can be turned on it, thus making the locking connection, The melted lead or other calking material is then poured into the annular recess $f$ and calked in the usual manner, and the coupling is made. The calking material, as it is poured into the annular recesses, enters into the spaces $l$ between the ribs $h$ and around the lugs $c$ within the locking-seats $g$, and thus locks the lugs within the seats and fills the calking-recesses between the locking-seats and the mouths or ends of the collar, entirely surrounding the tubing in this space above the locking-connection. It thus prevents any leakage at the coupling, even though the ends of the tubing do not fit close against the central ring or there is any imperfection at the lugs through which the water or other liquid, compressed air, or gas might escape, forming an absolutely-secure joint for this light metal tubing, which has been tested to a pressure of over one thousand pounds to the square inch without leaking. The locking-connection within the collar also secures the coupling against the longitudinal or drawing strain consequent to the contraction and expansion of the metal in different temperatures, and as the body of the tubing is not weakened at or near the ends of the collar (the lugs being below the calking material and protected by it) there is no more liability of injury to it from lateral or bending strain at the coupling than in the body of the tubing. I thus obtain a coupling which is comparatively inexpensive and by which light metal tubing can be securely connected against all strains without the weakening of the tubing, and at the same time obtain a smooth inner surface to the tubing and collar when connected, so that the fluid confined has no opportunity to press through the coupling and escape.

What I claim as my invention, and desire to secure by Letters Patent, is—

1. In couplings for tubing, the combination, with tubing having one or more lugs or other connecting devices at or near each end thereof, of a coupling collar or sleeve provided on the interior with a central ring, corresponding locking seat or seats on each side of said ring for the reception of the lugs on the tubing, and annular calking-recesses between such locking-seats and the ends of the collar, substantially as and for the purposes set forth.

2. In couplings for tubing, a coupling collar or sleeve provided on the interior with a central ring, an annular calking-recess at each end for the reception of calking material, and a series of wings extending across the mouth of each annular recess, where the wings are substantially triangular in shape, to permit the calking of the material underneath said wings, as and for the purposes set forth.

In testimony whereof I, the said EDMUND C. CONVERSE, have hereunto set my hand.

EDMUND C. CONVERSE.

Witnesses:
  A. CHANDON,
  JAMES I. KAY.